United States Patent
Etgen (10) Patent No.: US 11,880,008 B2
(45) Date of Patent: Jan. 23, 2024

(54) VELOCITY MODEL CONSTRUCTION

(71) Applicant: BP Corporation North America Inc., Houston, TX (US)

(72) Inventor: John Theodore Etgen, Houston, TX (US)

(73) Assignee: BP CORPORATION NORTH AMERICA INC., Houston, TX (US)

( * ) Notice: Subject to any disclaimer, the term of this patent is extended or adjusted under 35 U.S.C. 154(b) by 206 days.

(21) Appl. No.: 17/628,119

(22) PCT Filed: Jul. 29, 2020

(86) PCT No.: PCT/US2020/044026
§ 371 (c)(1),
(2) Date: Jan. 18, 2022

(87) PCT Pub. No.: WO2021/030058
PCT Pub. Date: Feb. 18, 2021

(65) Prior Publication Data
US 2022/0276401 A1 Sep. 1, 2022

Related U.S. Application Data

(60) Provisional application No. 62/884,946, filed on Aug. 9, 2019.

(51) Int. Cl.
*G01V 1/28* (2006.01)
*G01V 1/30* (2006.01)
*G01V 1/34* (2006.01)

(52) U.S. Cl.
CPC .............. *G01V 1/282* (2013.01); *G01V 1/303* (2013.01); *G01V 1/345* (2013.01)

(58) Field of Classification Search
CPC ......... G01V 1/282; G01V 1/303; G01V 1/345
See application file for complete search history.

(56) References Cited

U.S. PATENT DOCUMENTS

2009/0052280 A1* 2/2009 Herrmann ................ G01V 1/00
367/53
2009/0116336 A1 5/2009 Summerfield et al.
(Continued)

OTHER PUBLICATIONS

Morton et al., 'Industrial Seismic Imaging on Commodity Supercomputers', Sep. 9, 1999, IEEE Publication, pp. 1-9 (Year: 1999).*
(Continued)

*Primary Examiner* — Elias Desta
(74) *Attorney, Agent, or Firm* — CONLEY ROSE, P.C.

(57) ABSTRACT

Estimation of velocity models inclusive of receiving seismic data inclusive of data that corresponds to a seismic image, adding a velocity perturbation to a current velocity model that represents a portion of the subsurface responsible for a distortion in the seismic image to generate a perturbed velocity model, generating an image via seismic migration of the seismic data and the perturbed velocity model, generating and assigning a measure of quality to the image, determining whether the measure of quality assigned to the image is an optimal measure of quality at a particular location of the current velocity model, and updating the current velocity model to generate a revised velocity model utilizing the measure of quality assigned to the image when the measure of quality assigned to the image is determined to be the optimal measure of quality at the particular location of the current velocity model.

20 Claims, 8 Drawing Sheets

(56) References Cited

U.S. PATENT DOCUMENTS

2015/0177401 A1 6/2015 Amaru et al.
2015/0378039 A1 12/2015 Sun et al.

OTHER PUBLICATIONS

PCT/US2020/044026 International Search Report and Written Opinion dated Nov. 12, 2020 (10 p.).

* cited by examiner

VELOCITY MODEL CONSTRUCTION

CROSS-REFERENCE TO RELATED APPLICATIONS

This application is a 35 U.S.C. § 371 U.S. National Stage Entry application of PCT/US2020/044026 filed Jul. 29, 2020, and entitled "Velocity Model Construction," which claims benefit of U.S. provisional patent application Ser. No. 62/884,946 filed Aug. 9, 2019, and entitled "Velocity Model Construction," each of which is hereby incorporated herein by reference in its entirety for all purposes.

STATEMENT REGARDING FEDERALLY SPONSORED RESEARCH OR DEVELOPMENT

Not applicable.

BACKGROUND

The present disclosure relates generally to seismic image generation, and more specifically, to construction of seismic images used in seismic exploration and/or surveillance.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A seismic survey includes generating an image or map of a subsurface region of the Earth by sending sound energy down into the ground and recording the reflected sound energy that returns from the geological layers within the subsurface region. During a seismic survey, an energy source is placed at various locations on or above the surface region of the Earth, which may include hydrocarbon deposits. Each time the source is activated, the source generates a seismic (e.g., sound wave) signal that travels downward through the Earth, is reflected, and, upon its return, is recorded using one or more receivers disposed on or above the subsurface region of the Earth. The seismic data recorded by the receivers may then be used to create an image or profile of the corresponding subsurface region.

Over time, as hydrocarbons are being extracted from the subsurface region of the Earth, the location, saturation, and other characteristics of the hydrocarbon reservoir (e.g., overburden) within the subsurface region may change. As such, it may be useful to determine how the image or map of the subsurface region changes over time, such that the operations related to extracting the hydrocarbons may be modified to more efficiently extract the hydrocarbons from the subsurface region of the Earth.

SUMMARY

A summary of certain embodiments disclosed herein is set forth below. It may be understood that these aspects are presented merely to provide the reader with a brief summary of these certain embodiments and that these aspects are not intended to limit the scope of this disclosure. Indeed, this disclosure may encompass a variety of aspects that may not be set forth below. The construction of a seismic image depends on a model of the speed of seismic wave propagation in the subsurface (e.g., a velocity model). A velocity model can be a representation of the subsurface geological formation that can be used in the analysis of seismic data. One technique (or family of techniques) to model the speed of a seismic wave, referred to as "tomography," relies on analyzing migrated images that are generated with an initial estimate of the model and subsequent updating of the model. The updating of the model can be based on tomographic back-projection of measures of an error of a kinematic consistency of a seismic image, usually reflected by depth or time differences of pre-stack migrated images partitioned as a function of offset or angle. Utilizing received data (i.e., time series recorded data or traces) having variable surface offsets (i.e., the distance between the transmitting sources and the receivers) when generating a seismic image, the seismic data may be separated as a function of the respective source and receiver distances. A velocity estimate may be made, and a series of images can be generated, where each separate image is created from a subset of the full dataset. The subset is characterized by containing traces with some range of source to receiver offsets that is distinct from the other subsets. If the velocity estimate is correct, all of the gathered images as a function of their respective surface offsets would occur at a given (i.e., consistent) depth (i.e., the depth of a reflector of interest).

On the other hand, if instead the gathered images are not consistent at a given (i.e., consistent) depth (e.g., near and far surface offset seismic data are not the same), the estimated velocity model is incorrect in at least some way. Correction of the estimated velocity may be undertaken by utilizing the expected travel time of traces from a common point (i.e., the reflector of interest) and their surface offsets to generate an estimate of the error of the estimated velocity model. This process may be repeated for different depths or regions and all of the estimates of the error of the velocity estimate model may be compiled and analyzed to determine a new velocity estimate that best fits the generated estimates of the error of the estimated velocity model. This process (tomography) is useful when the area of Earth to be imaged is relatively consistent (i.e., where there are no complicated features such as volcanic beds nor any other complex geological features). However, in areas of the subsurface where the true speed of wave propagation is highly spatially variable (i.e., when the region through which the waves to the target must transit to be imaged is not consistent), it can be problematic to find an accurate sound speed model using simple techniques. Thus, although the first technique (tomography) is computationally fast, it is highly-approximate and relies on simplified models of wave propagation to update the sound speed model, which only works when the true model is sufficiently smooth.

Thus, in relatively complex areas, a different technique may need be applied instead. This second technique (or family of techniques) to model the speed of the seismic wave, which is referred to as "full waveform inversion (FWI)," includes a sound speed model being built iteratively by waveform fitting techniques that use the wave equation and computational simulation to search for a sound speed model that creates a dataset that closely matches the recorded data. This second technique tends to work best with low frequency waves that travel over a "diving" path from source to receivers.

The second technique (FWI) has an advantage with respect to the first technique (tomography) in that it is more general and is much more faithful to the physics of wave propagation. However, since the second technique involves attempts to directly simulate seismic data, the mismatch between the real physics and the computation physics can lead to incomplete results. In addition, since the second technique does not utilize seismic migration and image evaluation, it does not necessarily produce the best model for seismic migration. Furthermore, the second technique tends to work best in the shadow subsurface, but can be insufficient at deeper depths (i.e., the diving waves may only be able to reach regions of interest at a depth of approximately one third the distance between the source and receiver).

Thus, a third technique (i.e. targeted velocity model construction) may be utilized in place of the waveform fitting techniques (FWI) or tomographic back-projection techniques (tomography) to model the speed of the seismic wave. The targeted velocity model construction directly searches for a sound speed model that maximizes a measure of the quality of the sound speed model as measured directly from the migrated image. This third technique utilizes a measure of optimality of a sound speed model. With this technique, a sum of the squares of the amplitudes of the image (often called "stack power") can be used as an objective function measurement of the quality of a parameter model for seismic processing. Additionally, this technique can perform evaluation of a stack power in spatial windows after converting images to normal incidence travel time through their own sound speed model to improve the stationarity of the objective function with respect to changes in the model (e.g., reflectors in an image generated using an updated current velocity may move, therefore, by converting images to normal incidence travel time, this changes where reflectors move so that their movement can be canceled to produce a more "stationary" image to be evaluated).

Subsequently, to reduce the dimensionality of the model space and to improve the chance of finding an optimum model, targeted velocity model construction includes performing updates to the sound speed model that are decomposed into a hierarchical-scale set of spatially localized velocity perturbation basis functions, which includes searching from an initial coarse scale decomposition to successively finer scales whereby the updates at finer scales are largely linearly independent from scale to scale. Finally, performing targeted velocity model construction includes performing multiple migrations of a dataset to search for an optimum model, thus, a high-quality but efficient pre-stack migration algorithm is applied (e.g., Kirchhoff, one-wave equation, RTM, etc.).

In this manner, the targeted velocity model construction operates to merge optimized migration with the hierarchical-spatial-scale local-basis function decomposition of the model and utilizes stack power as an effective objective function for finding velocity models for seismic migration. Thus, methods of targeted velocity model construction can be applied to further improve a velocity model coming out of Tomography and/or FWI.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

Seismic data may provide valuable information with regard to the description such as the location and/or change of hydrocarbon deposits within a subsurface region of the Earth. Improvements to the processing of the seismic data and subsequent image generation may be made through improvements to the model of the speed of seismic wave propagation in the subsurface. As previously discussed, one technique (or family of techniques) to model the speed of the seismic wave, tomography, relies on analyzing migrated images generated with an initial estimate of the model and subsequent updating of the model based on tomographic back-projection of measures of the error of the kinematic consistency of the seismic image, usually reflected by the depth or time differences of pre-stack migrated images partitioned as a function of offset or angle. A second technique (or family of techniques) to model the speed of the seismic wave, full waveform inversion (FWI), includes a sound speed model being built iteratively by waveform fitting techniques that use the wave equation and computational simulation to search for a sound speed model that creates a dataset that closely matches the recorded data. However, there exist situations in which both tomography and FWI are insufficient to accurately model the model of the speed of seismic wave propagation in the subsurface. Accordingly, a third technique (or family of techniques) can be applied. This third technique (targeted velocity model construction) directly searches for a sound speed model that maximizes a measure of the quality of the sound speed model as measured directly from a migrated image. Additionally, the methods of targeted velocity model construction can be applied to further improve a velocity model coming out of tomography and/or FWI.

Figure 1:
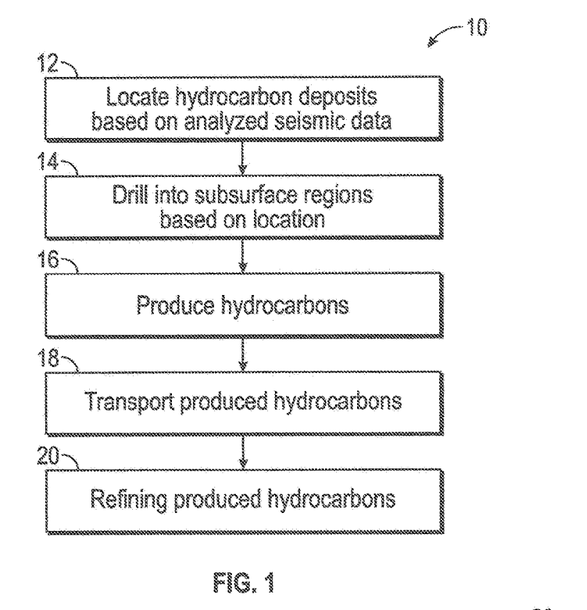
FIG. 1 illustrates a flow chart of various processes that may be performed based on analysis of seismic data acquired via a seismic survey system, in accordance with embodiments presented herein.
Figure 2:
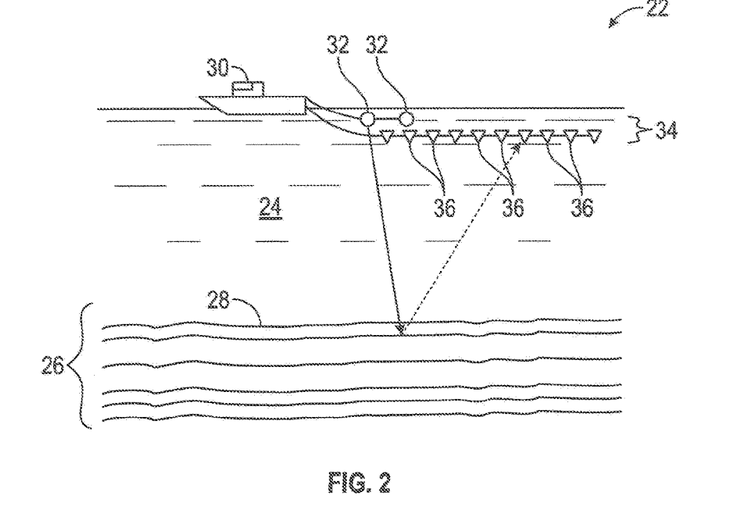
FIG. 2 illustrates a first survey system in a marine environment, in accordance with embodiments presented herein.
Figure 3:
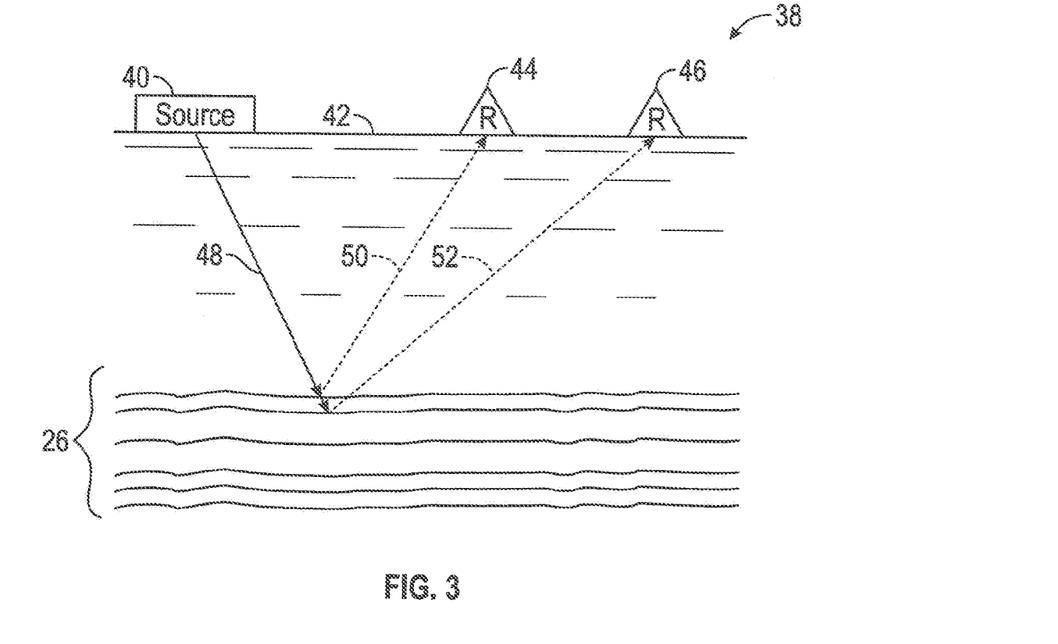
FIG. 3 illustrates a first survey system in a land environment, in accordance with embodiments presented herein.

By way of introduction, seismic data may be acquired by using a variety of seismic survey systems and techniques, two of which are discussed with respect to FIG. 2 and FIG. 3. Regardless of the seismic data gathering technique utilized, after the seismic data is acquired, a computing system may analyze the acquired seismic data and may use the results of the seismic data analysis (e.g., seismogram, map of geological formations, etc.) to perform various operations within the hydrocarbon exploration and production industries. For instance, FIG. 1 illustrates a flow chart of a method 10 that details various processes that may be undertaken based on the analysis of the acquired seismic data. Although the method 10 is described in a particular order, it is noted that the method 10 may be performed in any suitable order.

Referring now to FIG. 1, at block 12, locations and properties of hydrocarbon deposits within a subsurface region of the Earth associated with the respective seismic survey may be determined based on the analyzed seismic data. In one embodiment, the seismic data acquired via one or more seismic acquisition techniques may be analyzed to generate a map or profile that illustrates various geological formations within the subsurface region.

Based on the identified locations and properties of the hydrocarbon deposits, at block 14, certain positions or parts of the subsurface region may be explored. That is, hydrocarbon exploration organizations may use the locations of the hydrocarbon deposits to determine locations at the surface of the subsurface region to drill into the Earth. As such, the hydrocarbon exploration organizations may use the locations and properties of the hydrocarbon deposits and the associated overburdens to determine a path along which to drill into the Earth, how to drill into the Earth, and the like.

After exploration equipment has been placed within the subsurface region, at block 16, the hydrocarbons that are stored in the hydrocarbon deposits may be produced via natural flowing wells, artificial lift wells, and the like. At block 18, the produced hydrocarbons may be transported to refineries and the like via transport vehicles, pipelines, and the like. At block 20, the produced hydrocarbons may be processed according to various refining procedures to develop different products using the hydrocarbons.

It is noted that the processes discussed with regard to the method 10 may include other suitable processes that may be based on the locations and properties of hydrocarbon deposits as indicated in the seismic data acquired via one or more seismic survey. As such, it may be understood that the processes described above are not intended to depict an exhaustive list of processes that may be performed after determining the locations and properties of hydrocarbon deposits within the subsurface region.

With the forgoing in mind, FIG. 2 illustrates a marine survey system 22 (e.g., for use in conjunction with block 12 of FIG. 1) that may be employed to acquire seismic data (e.g., waveforms) regarding a subsurface region of the Earth in a marine environment. Generally, a marine seismic survey using the marine survey system 22 may be conducted in an ocean 24 or other body of water over a subsurface region 26 of the Earth that lies beneath a seafloor 28.

The marine survey system 22 may include a vessel 30, a seismic source 32, a streamer 34, a receiver 36, and/or other equipment that may assist in acquiring seismic images representative of geological formations within a subsurface region 26 of the Earth. The vessel 30 may tow the seismic source 32 (e.g., an air gun array) that may produce energy, such as sound waves (e.g., seismic waveforms), that is directed at a seafloor 28. The vessel 30 may also tow the streamer 34 having a receiver 36 (e.g., hydrophones) that may acquire seismic waveforms that represent the energy output by the seismic sources 32 subsequent to being reflected off of various geological formations (e.g., salt domes, faults, folds, etc.) within the subsurface region 26. Additionally, although the description of the marine survey system 22 is described with one seismic source 32 (represented in FIG. 2 as an air gun array) and one receiver 36 (represented in FIG. 2 as a plurality of hydrophones), it is noted that the marine survey system 22 may include multiple seismic sources 32 and multiple seismic receivers 36. In the same manner, although the above descriptions of the marine survey system 22 is described with one seismic streamer 34, it is noted that the marine survey system 22 may include multiple seismic streamers 34. In addition, additional vessels 30 may include additional seismic sources 32, seismic streamers 34, and the like to perform the operations of the marine survey system 22.

FIG. 3 illustrates a land survey system 38 (e.g., for use in conjunction with block 12 of FIG. 1) that may be employed to obtain information regarding the subsurface region 26 of the Earth in a non-marine environment. The land survey system 38 may include a (land-based) seismic source 40 and a (land-based) seismic receiver 44. In some embodiments, the land survey system 38 may include one or more multiple seismic sources 40 and one or more seismic receivers 44 and 46. Indeed, for discussion purposes, FIG. 3 includes a seismic source 40 and two seismic receivers 44 and 46. The seismic source 40 (e.g., seismic vibrator) that may be disposed on a surface 42 of the Earth above the subsurface region 26 of interest. The seismic source 40 may produce energy (e.g., sound waves, seismic waveforms) that is directed at the subsurface region 26 of the Earth. Upon reaching various geological formations (e.g., salt domes, faults, folds) within the subsurface region 26 the energy output by the seismic source 40 may be reflected off of the geological formations and acquired or recorded by one or more land-based receivers (e.g., 44 and 46).

In some embodiments, the seismic receivers 44 and 46 may be dispersed across the surface 42 of the Earth to form a grid-like pattern. As such, each seismic receiver 44 or 46 may receive a reflected seismic waveform in response to energy being directed at the subsurface region 26 via the seismic source 40. In some cases, one seismic waveform produced by the seismic source 40 may be reflected off of different geological formations and received by different receivers. For example, as shown in FIG. 3, the seismic source 40 may output energy that may be directed at the subsurface region 26 as seismic waveform 48. A first seismic receiver 44 may receive the reflection of the seismic waveform 48 off of one geological formation and a second receiver 46 may receive the reflection of the seismic waveform 48 off of a different geological formation. As such, the seismic first receiver 44 may receive a reflected seismic waveform 50 and the second receiver 46 may receive a reflected seismic waveform 52.

Figure 4:
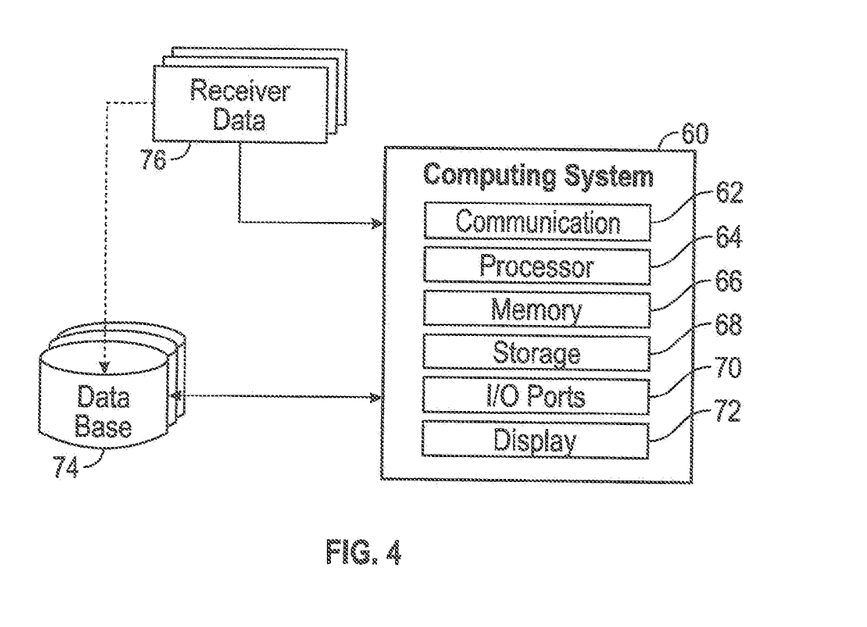
FIG. 4 illustrates a computing system that may perform operations described herein based on data acquired via the marine survey system of FIG. 2 and/or the survey system of FIG. 3, in accordance with embodiments presented herein.

Regardless of how the seismic data is acquired, a computing system (e.g., for use in conjunction with block 12 of FIG. 1) may analyze the seismic waveforms acquired by the (marine-based) seismic receivers 36 or the (land-based) seismic receivers 44 and 46 to determine information regarding the geological structure, the location and property of hydrocarbon deposits, and the like within the subsurface region 26. FIG. 4 illustrates an example of such a computing system 60 that may perform various data analysis operations to analyze the seismic data acquired by the receivers 36, 44, or 46 to determine the structure of the geological formations within the subsurface region 26.

Referring now to FIG. 4, the computing system 60 may include a communication component 62, a processor 64, memory 66 (e.g., a tangible, non-transitory, machine readable media), storage 68 (e.g., a tangible, non-transitory, machine readable media), input/output (I/O) ports 70, a display 72, and the like. The communication component 62 may be a wireless or wired communication component that may facilitate communication between the receivers 36, 44, 46, one or more databases 74, other computing devices, and other communication capable devices. In one embodiment, the computing system 60 may receive receiver data 76 (e.g., seismic data, seismograms) that may have been previously acquired by seismic receivers via a network component, the database 74, or the like. The processor 64 of the computing system 60 may analyze or process the receiver data 76 to ascertain various features regarding geological formations within the subsurface region 26 of the Earth.

The processor 64 may be any type of computer processor or microprocessor capable of executing computer-executable code or instructions to implement the methods described herein. The processor 64 may also include multiple processors that may perform the operations described below. The memory 66 and the storage 68 may be any suitable articles of manufacture that can serve as media to store processor-executable code, data, or the like. These articles of manufacture may represent computer-readable media (e.g., any suitable form of memory or storage) that may store the processor-executable code used by the processor 64 to perform the presently disclosed techniques. Generally, the processor 64 may execute software applications that include programs that process seismic data acquired via receivers of a seismic survey according to the embodiments described herein.

The memory 66 and the storage 68 may also be used to store the data, analysis of the data, the software applications, and the like. The memory 66 and the storage 68 may represent tangible, non-transitory, machine-readable media or non-transitory computer-readable media (e.g., any suitable form of memory or storage) that may store the processor-executable code used by the processor 64 to perform various techniques described herein. It may be noted that tangible and non-transitory merely indicates that the media is tangible and is not a signal.

The I/O ports 70 may be interfaces that may couple to other peripheral components such as input devices (e.g., keyboard, mouse), sensors, input/output (I/O) modules, and the like. I/O ports 70 may enable the computing system 60 to communicate with the other devices in the marine survey system 22, the land survey system 38, or the like via the I/O ports 70.

The display 72 may depict visualizations associated with software or executable code being processed by the processor 64. In one embodiment, the display 72 may be a touch display capable of receiving inputs from a user of the computing system 60. The display 72 may also be used to view and analyze results of the analysis of the acquired seismic data to determine the geological formations within the subsurface region 26, the location and property of hydrocarbon deposits within the subsurface region 26, and the like. The display 72 may be any suitable type of display, such as a liquid crystal display (LCD), plasma display, or an organic light emitting diode (OLED) display, for example. In addition to depicting the visualization described herein via the display 72, it may be noted that the computing system 60 may also depict the visualization via other tangible elements, such as paper (e.g., via printing) and the like.

With the foregoing in mind, the present techniques described herein may also be performed using a supercomputer that employs multiple computing systems 60, a cloud-computing system, or the like to distribute processes to be performed across multiple computing systems. In this case, each computing system 60 operating as part of a super computer may not include each component listed as part of the computing system 60. For example, each computing system 60 may not include the display 72 since the display 72 may not be useful to for a supercomputer designed to continuously process seismic data.

After performing various types of seismic data processing, the computing system 60 may store the results of the analysis in one or more databases 74. The databases 74 may be communicatively coupled to a network that may transmit and receive data to and from the computing system 60 via the communication component 62. In addition, the databases 74 may store information regarding the subsurface region 26, such as previous seismograms, geological sample data, seismic images, and the like regarding the subsurface region 26.

Although the components described above have been discussed with regard to the computing system 60, it may be noted that similar components may make up the computing system 60. Moreover, the computing system 60 may also be part of the marine survey system 22 or the land survey system 38, and thus may monitor and control certain operations of the seismic sources 32 or 40, the receivers 36, 44, 46, and the like. Further, it may be noted that the listed components are provided as example components and the embodiments described herein are not to be limited to the components described with reference to FIG. 4.

In some embodiments, the computing system 60 (and more specifically, the processor 64 operating in conjunction with at least one of the memory 66 or the storage 68) may generate a two-dimensional representation or a three-dimensional representation of the subsurface region 26 based on the seismic data received via the receivers mentioned above. Additionally, seismic data associated with multiple source/receiver combinations may be combined to create a near continuous profile of the subsurface region 26 that can extend for some distance. In a two-dimensional (2-D) seismic survey, the receiver locations may be placed along a single line, whereas in a three-dimensional (3-D) survey the receiver locations may be distributed across the surface in a grid pattern. As such, a 2-D seismic survey may provide a cross sectional picture (vertical slice) of the Earth layers as they exist directly beneath the recording locations. A 3-D seismic survey, on the other hand, may create a data "cube" or volume that may correspond to a 3-D picture of the subsurface region 26.

In addition, a 4-D (or time-lapse) seismic survey may include seismic data acquired during a 3-D survey at multiple times. Using the different seismic images acquired at different times, the computing system 60 may compare the two images to identify changes in the subsurface region 26.

In any case, a seismic survey may be composed of a very large number of individual seismic recordings or traces. As such, the computing system 60 may be employed to analyze the acquired seismic data to obtain an image representative of the subsurface region 26 and to determine locations and properties of hydrocarbon deposits. To that end, a variety of seismic data processing algorithms may be used to remove noise from the acquired seismic data, migrate the preprocessed seismic data, identify shifts between multiple seismic images, align multiple seismic images, and the like.

After the computing system 60 analyzes the acquired seismic data, the results of the seismic data analysis (e.g., seismogram, seismic images, map of geological formations, etc.) may be used to perform various operations within the hydrocarbon exploration and production industries. In some embodiments, the computing system 60 may provide an indication of the presence of hydrocarbons. As such, the computing system 60 may provide an indication of the subsurface region 26 that is likely to have hydrocarbons and provide a position (e.g., coordinates or a relative area) of regions that contain the hydrocarbon deposits and/or (in some cases) subsurface drilling hazards. In other embodiments, the image generated in accordance with the present techniques may be displayed via the display 72 of the computing system 60, thus facilitating locating a region by a user of the computing system 60. Accordingly, the acquired seismic data may be used to perform the method 78 of FIG. 5 that details an example of the various processes that may be undertaken based on the analysis of the acquired seismic data to provide a seismic data analysis.

Figure 5:
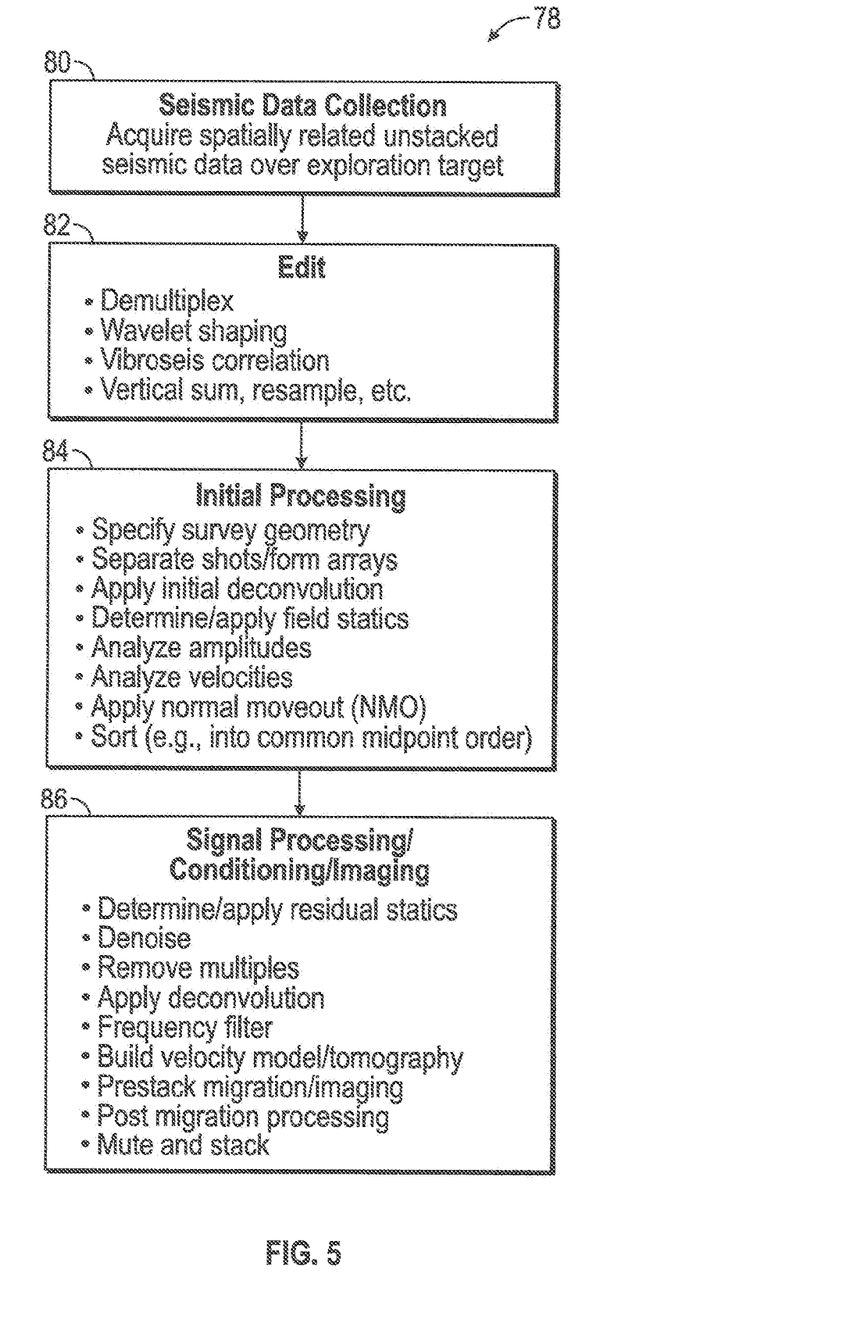
FIG. 5 illustrates a flow chart of a method for generating a seismic image via the computing system of FIG. 4, in accordance with embodiments presented herein.

In some embodiments, a seismic image may be generated in conjunction with a seismic processing scheme such as, for example, the method 78 illustrated in FIG. 5 by the computing system (and more specifically, the processor 64 operating in conjunction with at least one of the memory 66 or the storage 68). As illustrated, method 78 includes a seismic processing sequence that includes seismic data collection in step 80, editing of the seismic data in step 82, initial processing in step 84, and signal processing, conditioning, and imaging (which may, for example, include production of imaged sections or volumes) in step 86 prior to any interpretation of the seismic data, any further image enhancement consistent with the exploration objectives desired, generation of attributes from the processed seismic data, reinterpretation of the seismic data as needed, and determination and/or generation of a drilling prospect or other seismic survey applications. As a result of the method 78, location of hydrocarbons within a subsurface region 26 may be identified. Location of these hydrocarbons contained in hydrocarbon deposits may be based, at least in part, on the performance of processes in step 86, inclusive of pre-stack depth migration techniques used, for example, with surface common image gathers (CIGs), whereby the pre-stack depth migration techniques benefit from correction of an applied velocity model used in computing pre-stack depth migration data.

Figure 6:
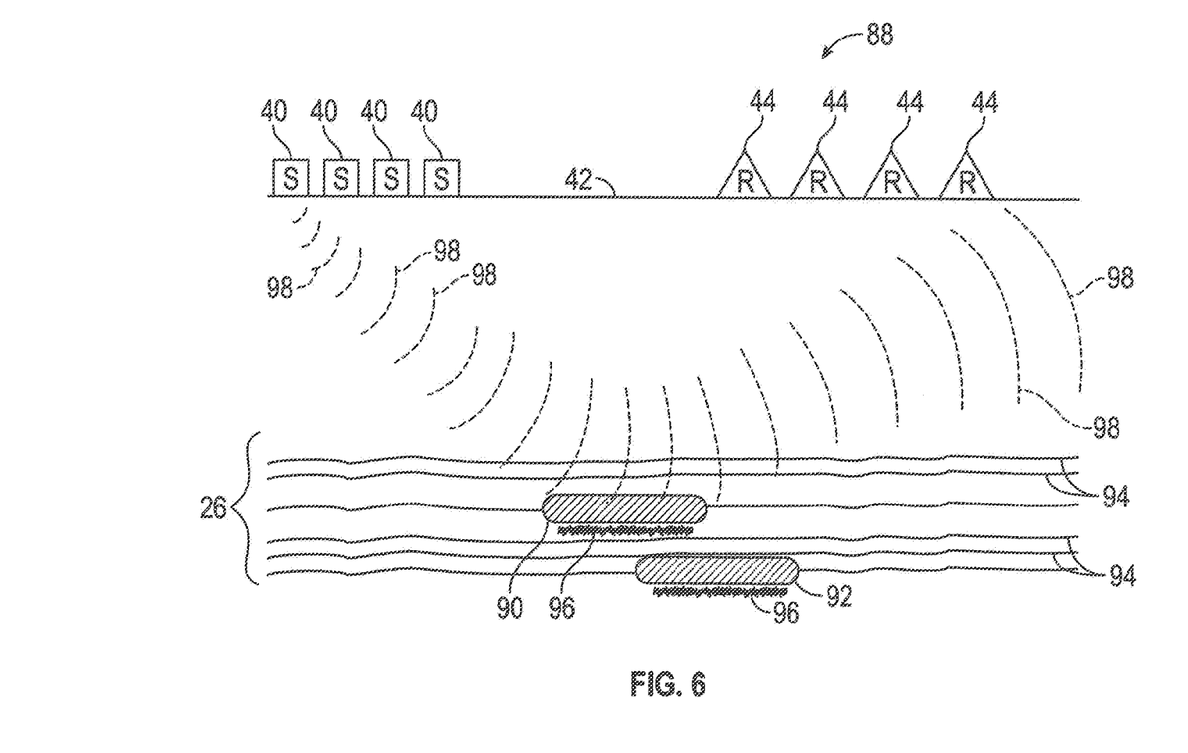
FIG. 6 illustrates a second survey system in a land environment, in accordance with embodiments presented herein.

FIG. 6 illustrates a land survey system 88 (although the illustrated example can also be applied to a marine system, for example, in place of marine survey system 22) that may be employed to obtain information regarding the subsurface region 26 of the Earth when the subsurface region 26 includes one or more complex geological features 90 and 92, in addition to the relatively consistent reflectors 94. As illustrated in the land survey system 88, the inclusion of the complex geological features 90 and 92 may limit the ability for the use of tomography, since the waves passing through the complex geological features 90 and 92 result in distorted waveforms 96.

Furthermore, the depth of the complex geological features 90 and 92 may be too deep in the Earth for FWI to be properly utilized, since the diving waves 98 that penetrate the complex geological features 90 and 92 are not received by the receivers 44 (i.e., the diving waves 98 may only be able to reach regions of interest at a depth of approximately one third the distance between the source 40 and receiver 44). Thus, methods of targeted velocity model construction may instead be utilized in place of the waveform fitting techniques (FWI) or tomographic back-projection techniques (tomography) to model the speed of the seismic wave, for example, in a land survey system 88 that includes one or more complex geological features 90 and 92 (i.e., where the existence and/or location of the one or more complex geological features 90 and 92 may be generally known, but their exact location and makeup are not known and/or discoverable via FWI or tomography).

Figure 7:
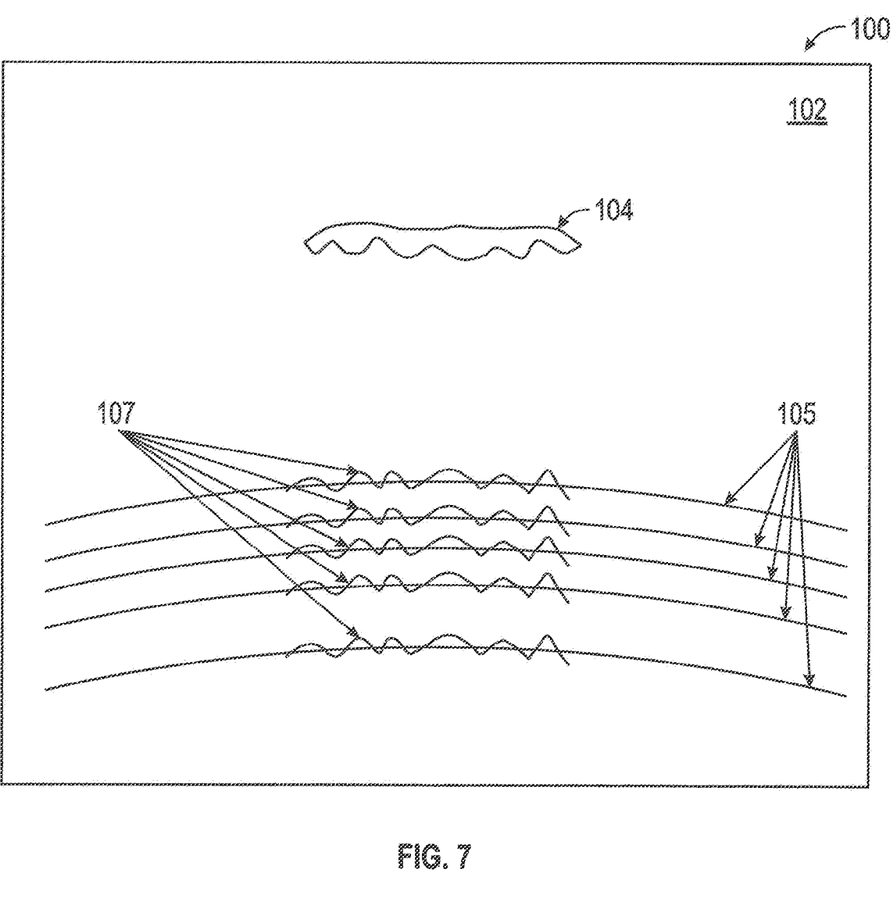
FIG. 7 illustrates a model of the Earth that includes an image generated utilizing a fixed data set and a trial velocity model, in accordance with embodiments presented herein.

Targeted velocity model construction generally includes generation of an image as a function of the velocity model (where the desired velocity model is initially unknown, so an initial guess is utilized as an initial velocity model) and the data, which is fixed (i.e., the recorded data as a fixed data set). The squares of all the values of the image can be summed to generate a measure of the quality of the image. This method may be referred to as "stack power optimization," or more generally as measuring "stacked power" or "stack power." That is, the quality of an image that is generated by utilizing a fixed data set and a trial velocity model (e.g., an initial velocity model) can be predicted by summing up the squares of the value of the generated image. This quality of the image is a measure of the optimality of the velocity model and will be discussed below as a technique utilized in conjunction with the targeted velocity model construction, FIG. 7 illustrates a model 100 of the Earth that includes the image 102 that is generated by utilizing the fixed data set and a trial (e.g., initial) velocity model, as generally discussed above with respect to FIG. 6. The image 102 includes a distorting feature 104 (e.g., a distorting velocity feature) that corresponds to a complex geological region (e.g., complex geological feature 90 or other distorting feature/formation in the subsurface). Also illustrated are reflectors 105 as well as distorted portions 107 of the image 102 that are generated when the velocity distribution in the distorting feature is incorrect.

The layer of the Earth inclusive of the distorting feature 104 is decomposed into a series of velocity basis functions. A velocity perturbation ($\Delta v$) can be added to the velocity model and the result is used in seismic migration to create an image. This will produce an image of the data using a velocity model that is perturbed at a jth location in space (i.e., distance across the velocity model) with a selected velocity perturbation magnitude. The size (i.e., large or small) and sign (i.e., positive or negative) of the velocity perturbation, as well as its location (i.e., a jth location in space, either in the x direction, the xy direction, or the xyz direction) can be chosen, for example by a random or by quasi-random techniques or may be predetermined locations and perturbations.

Figure 8:
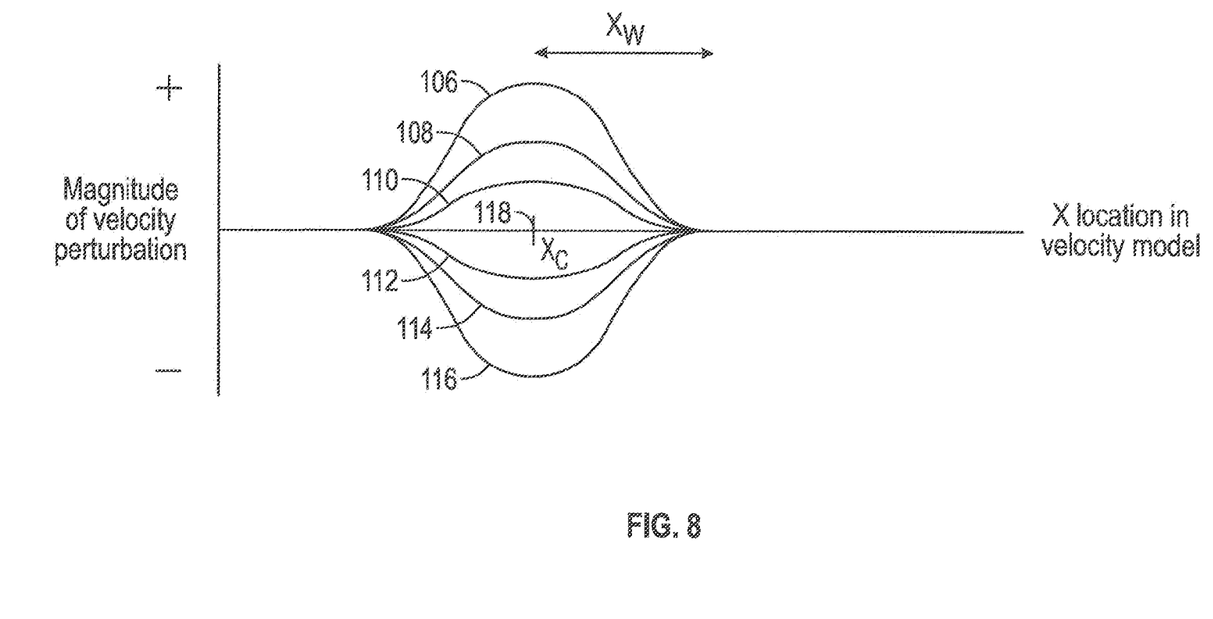
FIG. 8 illustrates a graph of velocity perturbations at a location in space with respect to the distortion portion of the image of FIG. 7, in accordance with embodiments presented herein.

FIG. 8 illustrates velocity perturbations 106, 108, 110, 112, 114, and 116 of various sizes and signs. These selectable velocity perturbations 106, 108, 110, 112, 114, and 116 are located at a jth location 118 in space (i.e., as measured in the x direction) of the velocity model. The imaging operation may be independently run for the data inclusive of each one of the velocity perturbations 106, 108, 110, 112, 114, and 116, i.e., an image is generated inclusive of a velocity perturbation 106, an image is generated inclusive of a velocity perturbation 108, etc. The squares of all the values of each image that is generated is summed, i.e. its stack power ("S") is determined, to generate a measure of the quality of that image.

This process can be repeated at additional locations in space (i.e., along the x direction in the velocity model) so that, for example, at a jth+1 location, additional velocity perturbations may be imaged and the corresponding "S" for the respective velocity perturbations at the jth+1 location are generated. As previously noted, selection of the locations and/or additional velocity perturbations may be predetermined or, for example, may be selected via a random or a quasi-random technique of taking samples of the model. The technique, for example, can be similar to or can be a Monte Carlo technique.

In this manner, the distorting feature 104 is broken into small elements (locations) and series of velocity perturbation are applied at selected locations of space in a velocity model. Images are generated at each location for each velocity perturbation at that location and the values of the squares of the images are summed for each image. That value, S, is logged. A chart or other collection of the logged values of S is generated. Thus, for every location at which the velocity model is perturbed (independently from every other location), a corresponding value of S is determined and logged, whereby S is a function of the amount of perturbation and a location "X" of the perturbation (for example, the central location, Xc, of the perturbation). The perturbation can be described by the following velocity perturbation basis function:

$$\frac{1}{2}\left(\cos\left(\frac{\pi(x - x_c)}{x_w}\right) + 1\right),$$

where Xc is the central location of the perturbation (as illustrated in FIG. 8), Xw is a scale of width of the perturbation (as illustrated in FIG. 8), and X is the distance in space in the velocity model (as illustrated in FIG. 8). The optimal (e.g., highest) values of S (e.g., an optimal velocity perturbation at a particular location having, for example, the highest value of S) is chosen, so that a set of the optimal values of S is generated. Thus, for each location across the distorting feature 104, there is a best estimation of the velocity model (i.e., alteration of the velocity model with a particular velocity perturbation) for that location and these best estimates are taken as a whole as an update to the velocity model. This update of the velocity model is generated based upon perturbation of portions of the velocity model that are then combined together using the aforementioned techniques (i.e., individual perturbations at the various locations of the velocity model are independent of one another and are combinable to determine an entire update to the velocity model). Therefore, the update to the velocity model is generated by summation of the optimal perturbations (as determined by the value of their respective value of S).

Figure 9A:
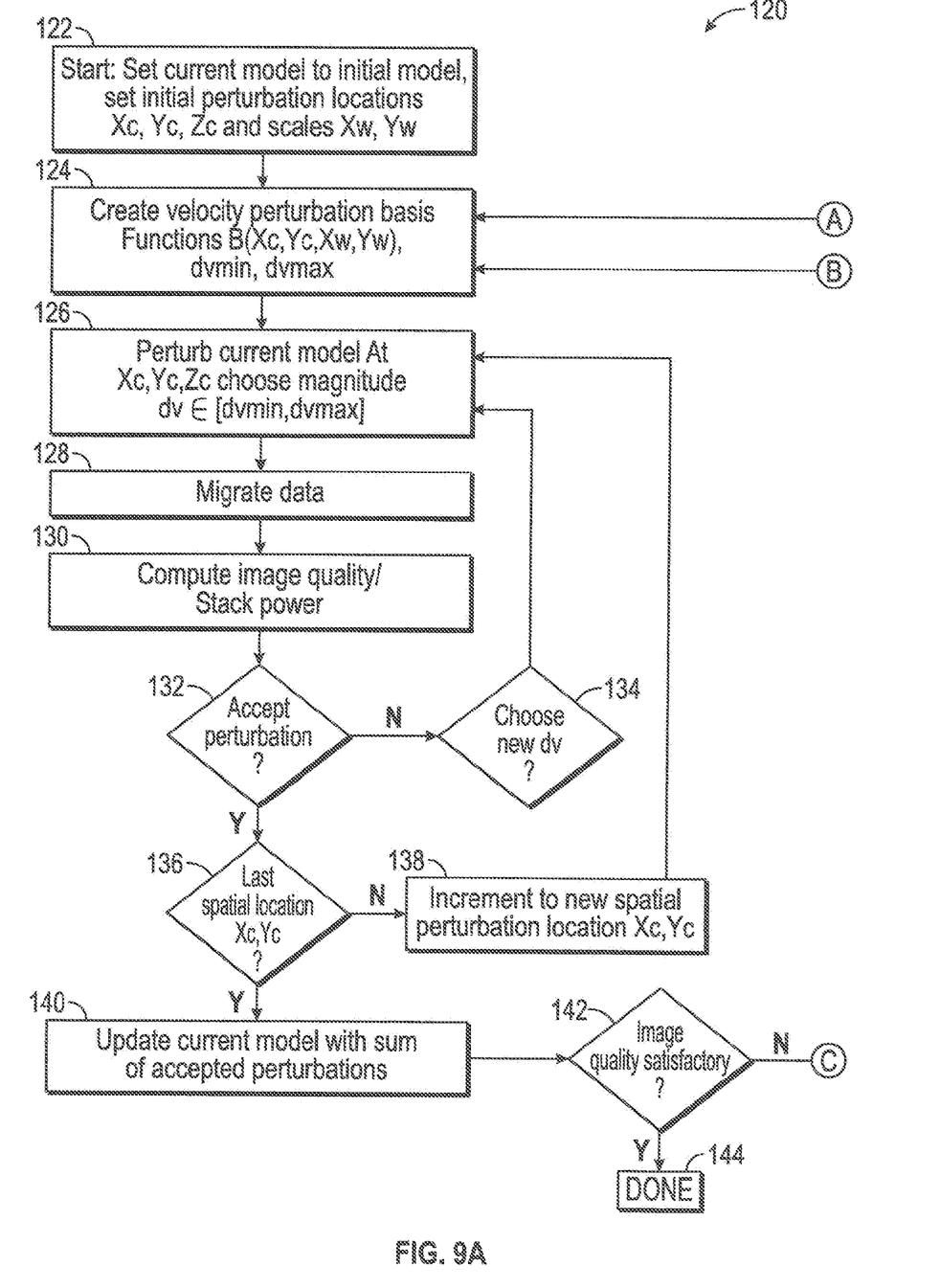
FIGS. 9A and 9B illustrate a method representative of targeted velocity model construction, in accordance with embodiments presented herein.
Figure 9B:
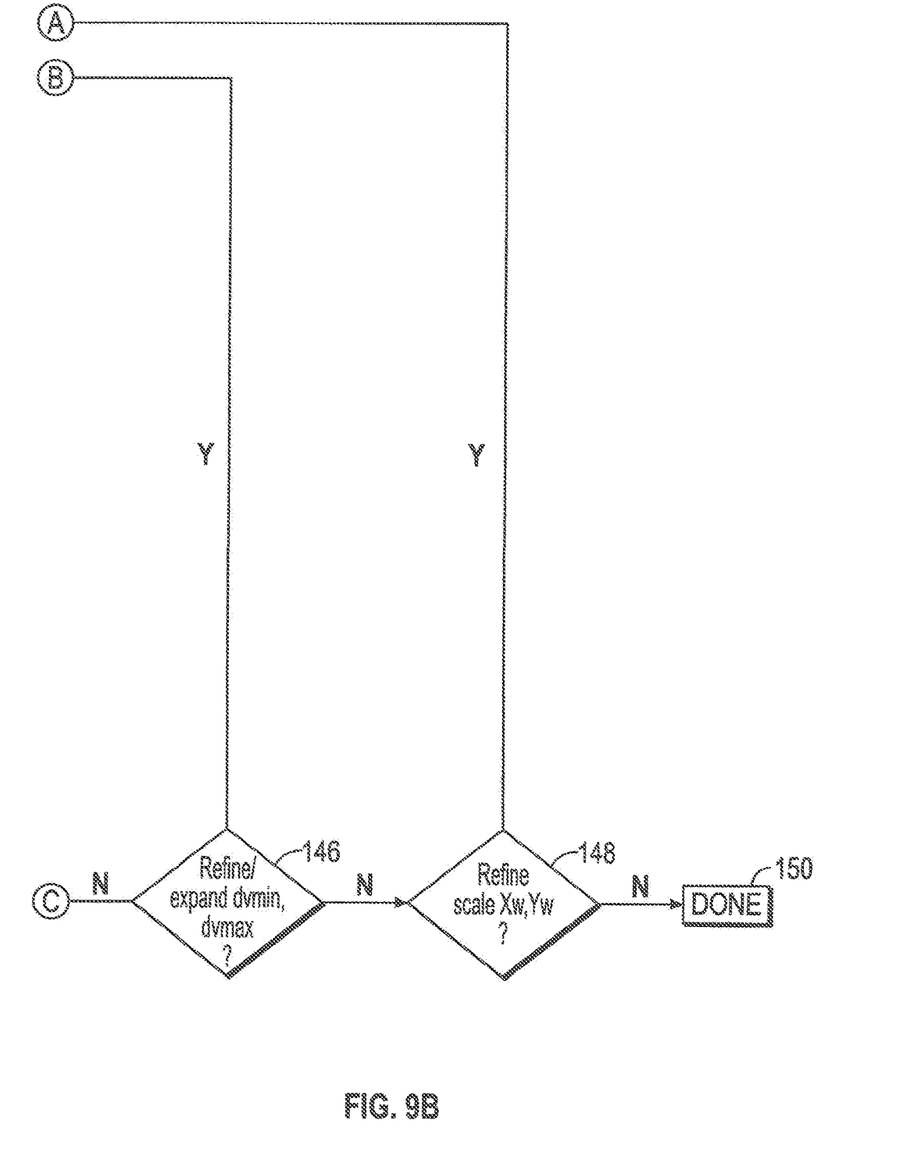

FIGS. 9A and 9B illustrate a method 120 representative of performing targeted velocity model construction for use with the land based system of FIG. 6 (or a marine based system with similar complex seismic attributes therein). Method 120 can be performed via the computing system 60 (and more specifically, the processor 64 operating in conjunction with at least one of the memory 66 or the storage 68, for example, by executing code or instructions to carry out the steps of method 120). In step 122, an initial velocity model is selected and the current velocity model is set to the initial velocity model. As discussed above, the desired velocity model may be initially unknown, so, in some embodiments, an initial guess is utilized as the initial velocity model. Furthermore, in step 122, initial perturbation locations and scales are selected. As illustrated, the initial perturbation locations selected include selection of a central location of the perturbation in the x direction (Xc), in the y direction (Ye), and in the z direction (Zc), when a three dimensional model is being determined. Alternatively, one or more of these locations may be omitted if a 1-D or a 2-D velocity model is being generated via method 120. Additionally, the example illustrated in step 122 is of a selection of scales, for example, scales of width of the perturbation in the x direction (Xw) and the y direction (Yw).

In step 124, the current velocity model (in the present example, the initial velocity model from step 122 as the current velocity model) is decomposed into a series of velocity basis functions for each direction of interest using the respectively chosen scales. Additionally, in step 124, determinations of the maximum and minimum changes in velocity perturbations (dvmin and dvmax) are made. In step 126, the current velocity model is perturbed by a selected velocity perturbation at a selected location. In step 128, migration is undertaken in conjunction with imaging of the data inclusive of the selected velocity perturbation at the selected location. In step 130, the squares of all the values of the image that is generated in step 128 is summed to generate a measure of the quality, i.e., a value of S, of that image, which is logged or otherwise recorded. In step 132, a determination is made if there is an additional velocity perturbation computation to be undertaken at the selected location. If an additional velocity perturbation at the selected location is to be processed, a new velocity perturbation is selected in step 134 and steps 126, 128, 130 and 132 are repeated for the different velocity perturbation selected in step 134. If no additional velocity perturbation at the selected location is to be processed, step 132 also includes a determination of the optimal (e.g., highest) values of S (e.g., an optimal velocity perturbation at the selected location having the highest value of S) based upon the previous iterations using differing velocity perturbations. This optimal value of S that is determined is saved, or otherwise logged, as the best estimation of the velocity model (i.e., alteration of the velocity model with a particular velocity perturbation) for the selected location to be used subsequently in the method 120 as a composite portion of an entire update to the velocity model.

Once the optimal value of S for a particular (selected) location is saved or otherwise cataloged in step 132, a determination is made in step 136 as to whether the selected location utilized in conjunction with step 132 was the last spatial location in which to determine S values for the velocity model. That is, in step 136, a determination is made as to whether there is an additional location at which targeted velocity model construction is to be undertaken. If so (i.e., if one or more velocity perturbations at another location of interest is to be processed), a next location is selected in step 138 and steps 126, 128, 132, 132, and 134 (if necessary) are repeated, leading again to step 136, in which the determination is again made as to whether the previously selected location utilized in step 132 was the last spatial location in which to determine S values for the velocity model. If in step 136 it is determined that the previously selected location from step 132 was the last spatial location in which to determine S values for the velocity model, then method 120 moves to step 140.

In step 140, the current velocity model is updated with the sum of the accepted perturbations (i.e., the optimal values of S saved or otherwise cataloged in step 132 for each location). Thus, the set of best estimations of the velocity model (i.e., alterations of the velocity model with a particular velocity perturbation at particular locations) are taken as a whole as an update to the velocity model, i.e., the update to the current velocity model is generated by summation of the optimal perturbations (as determined by the value of their respective S) in step 140. In step 142, a determination is made as to whether the image quality of an image generated (e.g., in one of step 140 or 142) using the updated current velocity model from step 140 meets a threshold (or, for example, if a total number of iterations have been reached or, for example, if a change in the updated current velocity model from step 140 is less than a threshold amount different from a previously generated updated current velocity model from step 140). If the image quality of the image generated is determined to be satisfactory in step 142, the process ends in step 144. Otherwise, if the image quality of the image generated is determined not to be satisfactory in step 142, the process continues in step 146.

In step 146, a determination is made whether to refine or expand the maximum and minimum changes in velocity perturbations (dvmin and dvmax) to increase the image quality to be generated in step 140. If the maximum and minimum changes in velocity perturbations (dvmin and dvmax) are determined to be refined or expanded in step 146, these new dvmin and dvmax values are used in step 124 and the above described process including steps 124, 126, 128, 130, 132, 134 (if necessary), 136, 138 (if necessary), 140, and 142 is repeated. If it is determined that the maximum and minimum changes in velocity perturbations (dvmin and dvmax) are not to be refined or expanded in step 146, the process continues to step 148, in which a determination is made whether to refine the scale, e.g., the scales of width of the perturbation in the x direction (Xw) and the y direction (Yw). If the scales are determined to be refined in step 148, new scales (e.g., Xw and Yw) are used in step 124 and the above described process including steps 124, 126, 128, 130, 132, 134 (if necessary), 136, 138 (if necessary), 140, and 142 are repeated. If it is determined that scales are not to be refined in step 148, the process ends at step 150. It should be noted that step 148 encompasses a process of method 120 in which a chosen coarse scale basis function is set and a simulated annealing or gradient ascent optimization method searches for an improved model, when a model is found that cannot be improved further at a given scale, the next finer scale is chosen, and the iteration proceeds again. This process is stopped in step 150 when a satisfactory model is found, as determined in step 148.

It should be noted that improvement of performance of the method 120 may additionally benefit from evaluating the stack power in spatial windows (i.e., an area of interest, such as distorting feature 104) after converting images to normal incidence travel time through their own sound speed model to improve the stationarity of the objective function with respect to changes in the velocity model. That is, the position of reflectors, for example, reflectors in the image generated using the updated current velocity model from step 140, may move. Therefore, by converting images to normal incidence travel time, this changes where reflectors move so that their movement can be canceled (i.e., to produce a more "stationary" image to be evaluated in step 142).

It should further be noted that if a model is simply decomposed into voxels (e.g., 30 pixels), the space of possible models is astronomically large, and a direct search of all possible models has little chance of determining an optimum model. Accordingly, to reduce the dimensionality of the model space and to improve the chance of determining an optimum model, updates to the sound speed model are decomposed into a hierarchical-scale set of spatially localized velocity perturbation basis functions. For example, Hanning window functions with velocity perturbation basis function centers half a period apart and with scales that refine by a factor of 2 from scale to scale may be utilized to generate the velocity perturbation basis functions in step 124. Relative independence of the effect on the migrated image of neighboring velocity perturbation basis functions in space and the ability to search for models starting from coarse scales to finer scales may be used as parameters when generating velocity perturbation basis functions in step 124 (i.e., subsequent to step 148 being performed).

Indeed velocity perturbation basis function decomposition, as described herein, can produce effects in the migrated images. These effects are sufficiently independent from spatial window to spatial window so that a search method based on a quenching-style simulated annealing approach rapidly locates improved sound speed models at a given scale of decomposition. Accordingly, the targeted velocity model construction may benefit from searching from an initial coarse scale decomposition to successively finer scales, whereby the updates at finer scales are largely linearly independent from scale to scale. Thus, through initial selection of large velocity perturbations for method 120 followed by smaller velocity perturbation for given locations upon second and (if necessary) subsequent iterations of the method 120, hierarchical based functional decomposition (i.e., simulated annealing) may be implemented to reduce an overall amount of searching of models performed.

Additionally, this hierarchical based functional decomposition can be combined with additional searching techniques, such as a Monte Carlo search for example, to select the locations at which to add velocity perturbations in step 126. It is further noted that the velocity perturbations at a particular location do not generally impact the other velocity perturbations at additional locations.

Furthermore, because the method 120 can include multiple migrations of a dataset to search for an optimum velocity model, a high-quality but efficient pre-stack migration algorithm is utilized. Examples of migration techniques that can produce accurate results quickly include, for example, Kirchhoff, one-way wave equation, RTM, etc. These migration techniques can be initially applied to low frequency versions of the dataset to locate an approximately optimum model and once that has been found, the frequency content of the data can be expanded to full bandwidth, which can allow for faster computations at early stages of refinement of the model, similar to FWI.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method, comprising:
receiving seismic data inclusive of data that corresponds to reflections from a target below a distorting velocity feature in a subsurface, wherein the presence of the distorting velocity feature results in distortion to a seismic image;
adding a velocity perturbation to a current velocity model that represents a portion of the subsurface responsible for the distortion to the seismic image, in order to generate a perturbed velocity model;
generating an image via seismic migration of the seismic data and the perturbed velocity model;
generating and assigning a measure of quality to the image;
determining whether the measure of quality assigned to the image is an optimal measure of quality at a particular location of the current velocity model that corresponds to the portion of the subsurface responsible for the distortion to the seismic image; and
updating the current velocity model utilized to generate the seismic image to generate a revised velocity model utilizing the measure of quality assigned to the image when the measure of quality assigned to the image is determined to be the optimal measure of quality at the particular location of the current velocity model that corresponds to the portion of the subsurface responsible for the distortion to the seismic image.

2. The method of claim 1, comprising determining whether an additional velocity perturbation is to be added to the current velocity model that represents the portion of the subsurface responsible for the distortion to the seismic image to generate a second perturbed velocity model.

3. The method of claim 2, comprising adding a second velocity perturbation to the current velocity model that represents the portion of the subsurface responsible for the distortion to the seismic image to generate the second perturbed velocity model when it is determined that the additional velocity perturbation is to be added to the current velocity model.

4. The method of claim 3, comprising:
generating a second image utilizing the second perturbed velocity model; and
generating and assigning a second measure of quality to the second image.

5. The method of claim 4, comprising determining whether the second measure of quality assigned to the second image is the optimal measure of quality at the particular location of the current velocity model that corresponds to the portion of the subsurface responsible for the distortion to the seismic image.

6. The method of claim 5, comprising updating the current velocity model utilized to generate the seismic image to generate the revised velocity model utilizing the second measure of quality assigned to the second image when the second measure of quality assigned to the second image is determined to be the optimal measure of quality at the particular location of the current velocity model that corresponds to the portion of the subsurface responsible for the distortion to the seismic image.

7. The method of claim 1, comprising determining whether an additional velocity perturbation is to be added to the current velocity model at a second location of the current velocity model.

8. The method of claim 7, comprising adding a second velocity perturbation to the current velocity model at the second location to generate a second perturbed velocity model when it is determined that the additional velocity perturbation is to be added to the current velocity model at the second location of the current velocity model.

9. The method of claim 8, comprising:
generating a second image utilizing the second perturbed velocity model; and
generating and assigning a second measure of quality to the second image.

10. The method of claim 9, comprising determining whether the second measure of quality assigned to the second image is a second optimal measure of quality at the second location of the current velocity model that corresponds to the portion of the subsurface responsible for the distortion to the seismic image.

11. The method of claim 10, comprising updating the current velocity model utilized to generate the seismic image to generate a second revised velocity model utilizing the second measure of quality assigned to the second image when the second measure of quality assigned to the second image is determined to be the second optimal measure of quality at the second location of the current velocity model that corresponds to the portion of the subsurface responsible for the distortion to the seismic image.

12. The method of claim 11, comprising generating an updated current velocity model by summing the revised velocity model and the second revised velocity model.

13. The method of claim 12, comprising:
generating a second seismic image utilizing the updated current velocity model, wherein the second seismic image represents hydrocarbons in a subsurface region of Earth or subsurface drilling hazards; and
determining whether a quality of the second seismic image meets a threshold value.

14. The method of claim 13, comprising:
refining a scale of width of a perturbation in at least one direction subsequent to a determination that the quality of the second seismic image does not meet the threshold value;
updating the current velocity model with the updated current velocity model;
adding a third velocity perturbation to the current velocity model to generate a third perturbed velocity model;
generating a third image utilizing the third perturbed velocity model;
generating and assigning a third measure of quality to the third image;
determining whether the third measure of quality assigned to the third image is a third optimal measure of quality at the particular location of the current velocity model; and
updating the current velocity model utilized to generate the seismic image to generate a third revised velocity model utilizing the third measure of quality assigned to the third image when the third measure of quality assigned to the third image is determined to be the third optimal measure of quality at the particular location of the current velocity model.

15. A tangible, non-transitory, machine-readable media, comprising instructions that when executed cause a processor to:
receive seismic data inclusive of data that corresponds to reflections from a target below a distorting velocity feature in a subsurface, wherein the presence of the distorting velocity feature results in distortion to a seismic image;

add a velocity perturbation to a current velocity model that represents a portion of the subsurface responsible for the distortion to the seismic image, in order to generate a perturbed velocity model;

generate an image via seismic migration of the seismic data and the perturbed velocity model;

generate and assign a measure of quality to the image;

determine whether the measure of quality assigned to the image is an optimal measure of quality at a particular location of the current velocity model that corresponds to the portion of the subsurface responsible for the distortion to the seismic image; and update the current velocity model utilized to generate the seismic image to generate a revised velocity model utilizing the measure of quality assigned to the image when the measure of quality assigned to the image is determined to be the optimal measure of quality at the particular location of the current velocity model that corresponds to the portion of the subsurface responsible for the distortion to the seismic image.

16. The tangible, non-transitory, machine-readable media of claim 15, comprising instructions that when executed cause the processor to:

add a second velocity perturbation to the current velocity model that represents the portion of the subsurface responsible for the distortion to the seismic image to generate a second perturbed velocity model when it is determined that an additional velocity perturbation is to be added to the current velocity model;

generate a second image utilizing the second perturbed velocity model;

generate and assign a second measure of quality to the second image; and determine whether the second measure of quality assigned to the second image is the optimal measure of quality at the particular location of the current velocity model that corresponds to the portion of the subsurface responsible for the distortion to the seismic image.

17. The tangible, non-transitory, machine-readable media of claim 16, comprising instructions that when executed cause the processor to update the current velocity model utilized to generate the seismic image to generate the revised velocity model utilizing the second measure of quality assigned to the second image when the second measure of quality assigned to the second image is determined to be the optimal measure of quality at the particular location of the current velocity model that corresponds to the portion of the subsurface responsible for the distortion to the seismic image.

18. The tangible, non-transitory, machine-readable media of claim 15, comprising instructions that when executed cause the processor to:

determine whether an additional velocity perturbation is to be added to the current velocity model at a second location of the current velocity model;

add a second velocity perturbation to the current velocity model at the second location to generate a second perturbed velocity model when it is determined that the additional velocity perturbation is to be added to the current velocity model at the second location of the current velocity model;

generate a second image utilizing the second perturbed velocity model;

generate and assign a second measure of quality to the second image; and determine whether the second measure of quality assigned to the second image is a second optimal measure of quality at the second location of the current velocity model that corresponds to the portion of the subsurface responsible for the distortion to the seismic image.

19. The tangible, non-transitory, machine-readable media of claim 18, comprising instructions that when executed causes the processor to update the current velocity model utilized to generate the seismic image to generate a second revised velocity model utilizing the second measure of quality assigned to the second image when the second measure of quality assigned to the second image is determined to be the second optimal measure of quality at the second location of the current velocity model that corresponds to the portion of the subsurface responsible for the distortion to the seismic image.

20. A device, comprising:

a processor that when in operation:

receives seismic data inclusive of data that corresponds to reflections from a target below a distorting velocity feature in a subsurface, wherein the presence of the distorting velocity feature results in distortion to a seismic image;

adds a velocity perturbation to a current velocity model that represents a portion of the subsurface responsible for the distortion to the seismic image, in order to generate a perturbed velocity model;

generates an image via seismic migration of the seismic data and the perturbed velocity model;

generates and assign a measure of quality to the image;

determines whether the measure of quality assigned to the image is an optimal measure of quality at a particular location of the current velocity model that corresponds to the portion of the subsurface responsible for the distortion to the seismic image; and updates the current velocity model utilized to generate the seismic image to generate a revised velocity model utilizing the measure of quality assigned to the image when the measure of quality assigned to the image is determined to be the optimal measure of quality at the particular location of the current velocity model that corresponds to the portion of the subsurface responsible for the distortion to the seismic image.

* * * * *